US010788150B2

(12) United States Patent
Parsley et al.

(10) Patent No.: US 10,788,150 B2
(45) Date of Patent: Sep. 29, 2020

(54) TUBE SEAL

(71) Applicant: Freudenberg-NOK General Partnership, Plymouth, MI (US)

(72) Inventors: Adam K. Parsley, Connersville, IN (US); Zachary A. Schultz, Rushville, IN (US)

(73) Assignee: Freudenberg-NOK General Partnership, Plymouth, MI (US)

( * ) Notice: Subject to any disclaimer, the term of this patent is extended or adjusted under 35 U.S.C. 154(b) by 315 days.

(21) Appl. No.: 15/933,200

(22) Filed: Mar. 22, 2018

(65) Prior Publication Data

US 2019/0293215 A1    Sep. 26, 2019

(51) Int. Cl.

| | | |
|---|---|---|
| *F16L 21/02* | (2006.01) | |
| *F16J 15/3232* | (2016.01) | |
| *F16L 25/12* | (2006.01) | |
| *F16L 17/00* | (2006.01) | |
| *F16L 27/107* | (2006.01) | |
| *F16L 27/10* | (2006.01) | |

(52) U.S. Cl.
CPC ........... *F16L 21/02* (2013.01); *F16J 15/3232* (2013.01); *F16L 17/00* (2013.01); *F16L 25/12* (2013.01); *F16L 27/107* (2013.01); *F16L 27/1017* (2013.01)

(58) Field of Classification Search
CPC ....... F16L 21/02; F16L 21/025; F16L 21/035; F16L 25/12; F16J 15/3232
USPC .......................................... 285/110, 111, 112
See application file for complete search history.

(56) References Cited

U.S. PATENT DOCUMENTS

| | | | |
|---|---|---|---|
| 788,742 A | 5/1905 | Weston | |
| 996,588 A | 6/1911 | Kennedy | |
| 2,519,436 A | 8/1950 | Cadman | |
| 2,598,002 A | 5/1952 | Langdon | |
| 2,647,636 A | 8/1953 | Rafferty | |
| 2,809,853 A * | 10/1957 | Nathan | ................. F16L 21/025 |
| | | | 277/607 |
| 2,908,283 A | 10/1959 | Kiffer et al. | |
| 2,974,684 A | 3/1961 | Ginaven et al. | |

(Continued)

FOREIGN PATENT DOCUMENTS

| | | | | |
|---|---|---|---|---|
| CH | 438864 A * | 6/1967 | ............ | F16L 21/025 |
| DE | 1609088 A1 | 1/1970 | | |

(Continued)

OTHER PUBLICATIONS

International Search Report dated May 29, 2019 (corresponding to PCT/US2019/023077).

(Continued)

*Primary Examiner* — David Bochna
(74) *Attorney, Agent, or Firm* — Daniel J. Sepanik, Esq.; Harness, Dickey & Pierce, P.L.C.

(57) ABSTRACT

A tube seal includes a cylindrical tube and an elastomeric seal body molded to the cylindrical tube. The elastomeric seal body includes a pair of seal lip regions extending from opposite ends of the rigid cylindrical tube and inserted into a respective bore of a pair of opposing members for providing a sealing relationship there between. The seal lip regions each include, in an unassembled condition, an axially extending seal lip and a radially outwardly extending seal lip connected to the ends of the rigid cylindrical tube by an elastomeric hinge region.

24 Claims, 4 Drawing Sheets

(56) References Cited

U.S. PATENT DOCUMENTS

| | | | |
|---|---|---|---|
| 3,016,147 A | 1/1962 | Cobb et al. | |
| 3,280,982 A | 10/1966 | Barto | |
| 3,368,830 A * | 2/1968 | French | F16L 17/035 |
| | | | 285/110 |
| 3,386,745 A | 6/1968 | Hein | |
| 3,422,844 A | 1/1969 | Grise | |
| 3,501,158 A | 3/1970 | Tillman | |
| 3,602,531 A | 8/1971 | Patry | |
| 3,829,107 A * | 8/1974 | Machado | F16J 15/3232 |
| | | | 285/230 |
| 3,884,510 A | 5/1975 | Bram et al. | |
| 3,915,481 A | 10/1975 | Marsh, Jr. | |
| 3,979,130 A | 9/1976 | Cowie et al. | |
| 3,995,888 A | 12/1976 | McIlroy | |
| 4,116,474 A * | 9/1978 | Wolf | F16L 21/022 |
| | | | 285/110 |
| 4,198,079 A | 4/1980 | Shah | |
| 4,242,164 A | 12/1980 | Skinner | |
| 4,310,184 A | 1/1982 | Campbell | |
| 4,327,891 A | 5/1982 | Allen et al. | |
| 4,346,647 A | 8/1982 | Weaver | |
| 4,531,711 A | 7/1985 | Bunch et al. | |
| 4,553,759 A | 11/1985 | Kilmoyer | |
| 4,657,285 A | 4/1987 | Akiyama et al. | |
| 4,664,800 A | 5/1987 | Raines et al. | |
| 4,763,695 A | 8/1988 | Dooley | |
| 4,795,320 A | 1/1989 | Tuckey | |
| 4,900,041 A | 2/1990 | Hopkins et al. | |
| 4,905,736 A | 3/1990 | Kitami et al. | |
| 4,930,791 A | 6/1990 | Ungchusri et al. | |
| 5,010,925 A | 4/1991 | Atkinson et al. | |
| 5,078,211 A | 1/1992 | Swineford | |
| 5,133,324 A | 7/1992 | Michiaki et al. | |
| 5,163,717 A | 11/1992 | Wise | |
| 5,284,582 A | 2/1994 | Yang et al. | |
| 5,330,156 A | 7/1994 | McKavanagh et al. | |
| 5,338,070 A | 8/1994 | Horikawa et al. | |
| 5,398,976 A | 3/1995 | Webb | |
| 5,456,475 A | 10/1995 | Abraham et al. | |
| 5,564,715 A | 10/1996 | Wallace | |
| 5,564,716 A | 10/1996 | Onoue et al. | |
| 5,624,124 A | 4/1997 | Ungchusri et al. | |
| 5,649,712 A | 7/1997 | Ekholm | |
| 5,649,713 A | 7/1997 | Ledgerwood | |
| 5,685,345 A | 11/1997 | Gieseke et al. | |
| 5,766,469 A | 6/1998 | Boast et al. | |
| 5,851,036 A | 12/1998 | Vanesky | |
| 5,884,669 A | 3/1999 | Braun et al. | |
| 5,935,434 A | 8/1999 | Cates | |
| 6,090,282 A | 7/2000 | Roman et al. | |
| 6,112,952 A | 9/2000 | Hess, III et al. | |
| 6,155,302 A | 12/2000 | Fischerkeller et al. | |
| 6,290,240 B1 | 9/2001 | Knapp et al. | |
| 6,408,890 B1 | 6/2002 | Mori et al. | |
| 6,435,566 B1 | 8/2002 | Topf, Jr. | |
| 6,439,620 B1 | 8/2002 | Guest | |
| 6,453,941 B1 | 9/2002 | Milhas et al. | |
| 6,454,314 B1 | 9/2002 | Grosspietsch et al. | |
| 6,548,760 B1 | 4/2003 | Stout, Jr. | |
| 6,565,093 B2 | 5/2003 | Crow et al. | |
| 6,705,615 B2 | 3/2004 | Milberger et al. | |
| 6,709,575 B1 | 3/2004 | Verdegan et al. | |
| 6,769,721 B2 | 8/2004 | Guest et al. | |
| 6,800,108 B2 | 10/2004 | Noda et al. | |
| 6,824,117 B2 | 11/2004 | Horton et al. | |
| 6,923,908 B1 | 8/2005 | Thompson et al. | |
| 6,962,373 B2 | 11/2005 | Houghton | |
| 8,083,237 B2 * | 12/2011 | Smith | F16J 15/104 |
| | | | 277/616 |
| 2003/0155721 A1 | 8/2003 | Zheng | |
| 2005/0040649 A1 | 2/2005 | Katayama et al. | |
| 2006/0016497 A1 | 1/2006 | Paul | |
| 2007/0267824 A1 | 11/2007 | Baugh et al. | |
| 2009/0267307 A1 * | 10/2009 | Smith | F16L 21/022 |
| | | | 277/584 |
| 2014/0091533 A1 | 4/2014 | Unger et al. | |
| 2015/0192206 A1 | 7/2015 | Wagner | |

FOREIGN PATENT DOCUMENTS

| | | | |
|---|---|---|---|
| DE | 3418718 | 11/1985 | |
| DE | 19548249 | 6/1997 | |
| DE | 19902953 | 8/2000 | |
| EP | 617221 | 9/1994 | |
| EP | 2713034 A1 * | 4/2014 | F16L 25/14 |
| GB | 2094443 A | 9/1982 | |
| IT | 1393549 B1 | 4/2012 | |
| WO | 2007/145779 | 12/2007 | |

OTHER PUBLICATIONS

Written Opinion dated May 29, 2019 (corresponding to PCT/US2019/023077).

\* cited by examiner

TUBE SEAL

FIELD

The present disclosure relates to a tube seal that provides low insertion load and improved sealing under operating conditions.

BACKGROUND

This section provides background information related to the present disclosure which is not necessarily prior art.

Historically, the standard method of sealing two joints not directly connected to each other has been to use a tube with an O-ring at each end. This design has been found to have two main deficiencies; the first being the seal's inability to compensate for offset between the two bores and the second being various assembly issues including missing O-rings, cut O-rings, and rolled O-rings.

Sealing applications typically require sealing between two members and sometimes require the ability to accommodate significant movement, misalignment or offset between the two members. Static offset sealing applications are used in engine, transmission, turbo, cooling, battery cells and industrial applications. Conventional static seals sometimes use trapped rubber beads which require significant axial force for assembly. Accordingly, it is desirable in the art to provide a tube seal arrangement that has the ability to accommodate offset between two members and which requires a relatively low load for installation between the two members.

SUMMARY

This section provides a general summary of the disclosure, and is not a comprehensive disclosure of its full scope or all of its features.

The present disclosure provides a tube seal, including a rigid cylindrical tube and an elastomeric seal body molded to the cylindrical tube. The elastomeric seal body includes a pair of seal lip regions extending from opposite ends of the rigid cylindrical tube and inserted into a respective bore of a pair of opposing members for providing a sealing relationship there between. The seal lip regions each include, in an unassembled condition, an axially extending seal lip and a radially outwardly extending seal lip connected to the ends of the rigid cylindrical tube by an elastomeric hinge region.

In an unassembled condition the axially extending seal lip has an outer diameter smaller than the inner diameter of the bore and the radially extending seal lip has an outer diameter larger than the inner diameter of the bore.

In an assembled condition the radially outwardly extending seal lip of the pair of seal lip regions are deformed radially inward and axially toward the rigid cylindrical tube and the axially extending seal lip is pivoted radially outward toward the bore.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
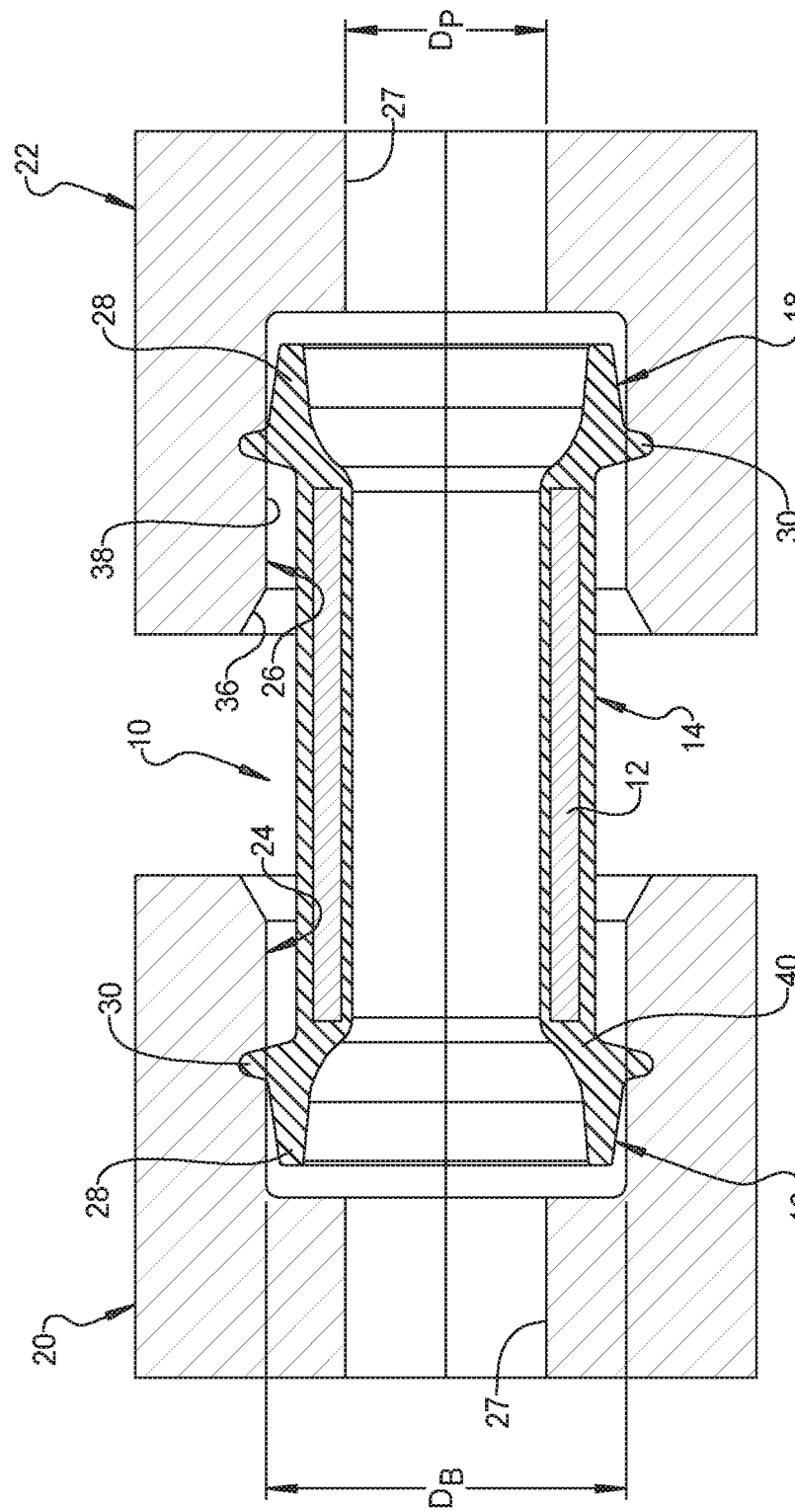
FIG. 1 is a cross sectional view of a tube seal according to the principles of the present disclosure shown in an un-deformed state for connection between two members.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Figure 2:
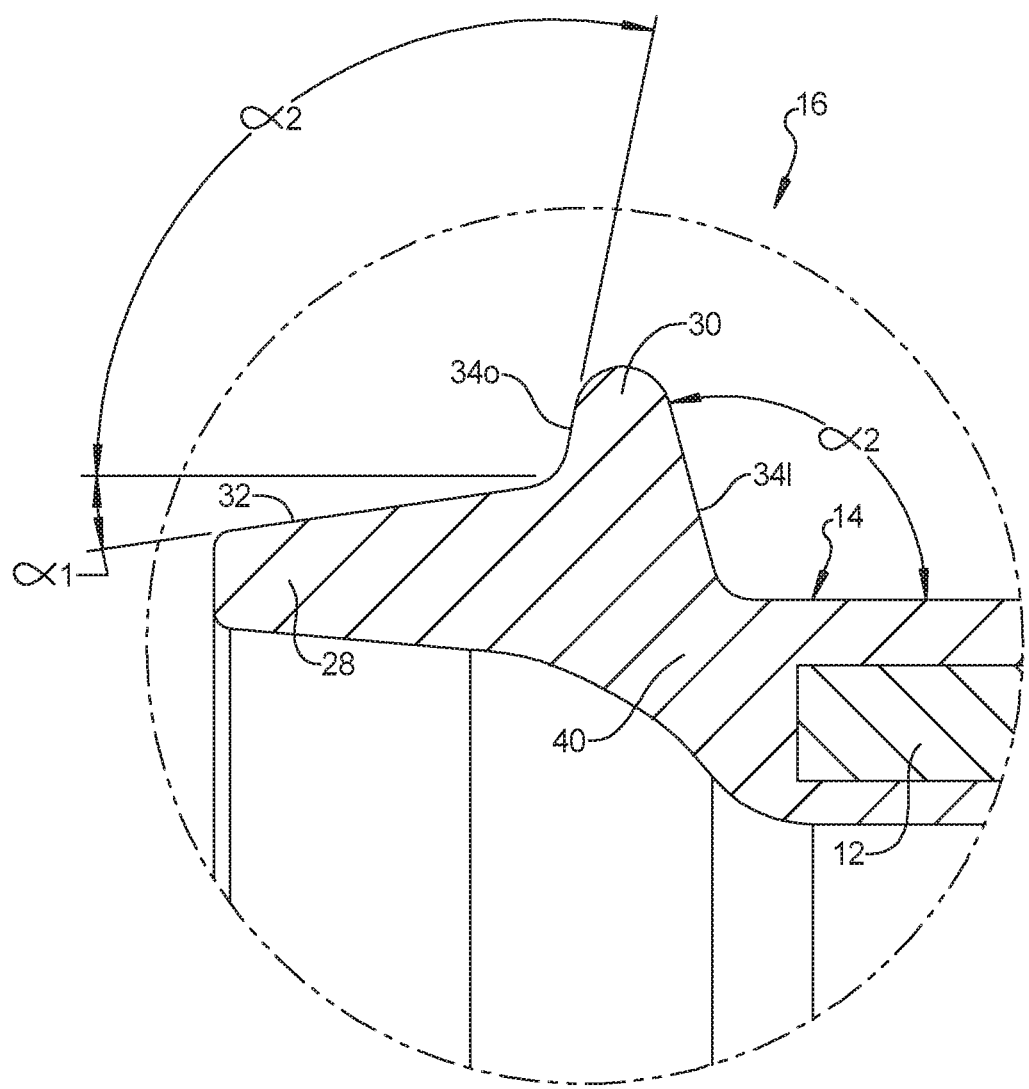
FIG. 2 is a detailed cross-sectional view of the un-deformed seal lip region of the tube seal shown in FIG. 1.
Figure 4:
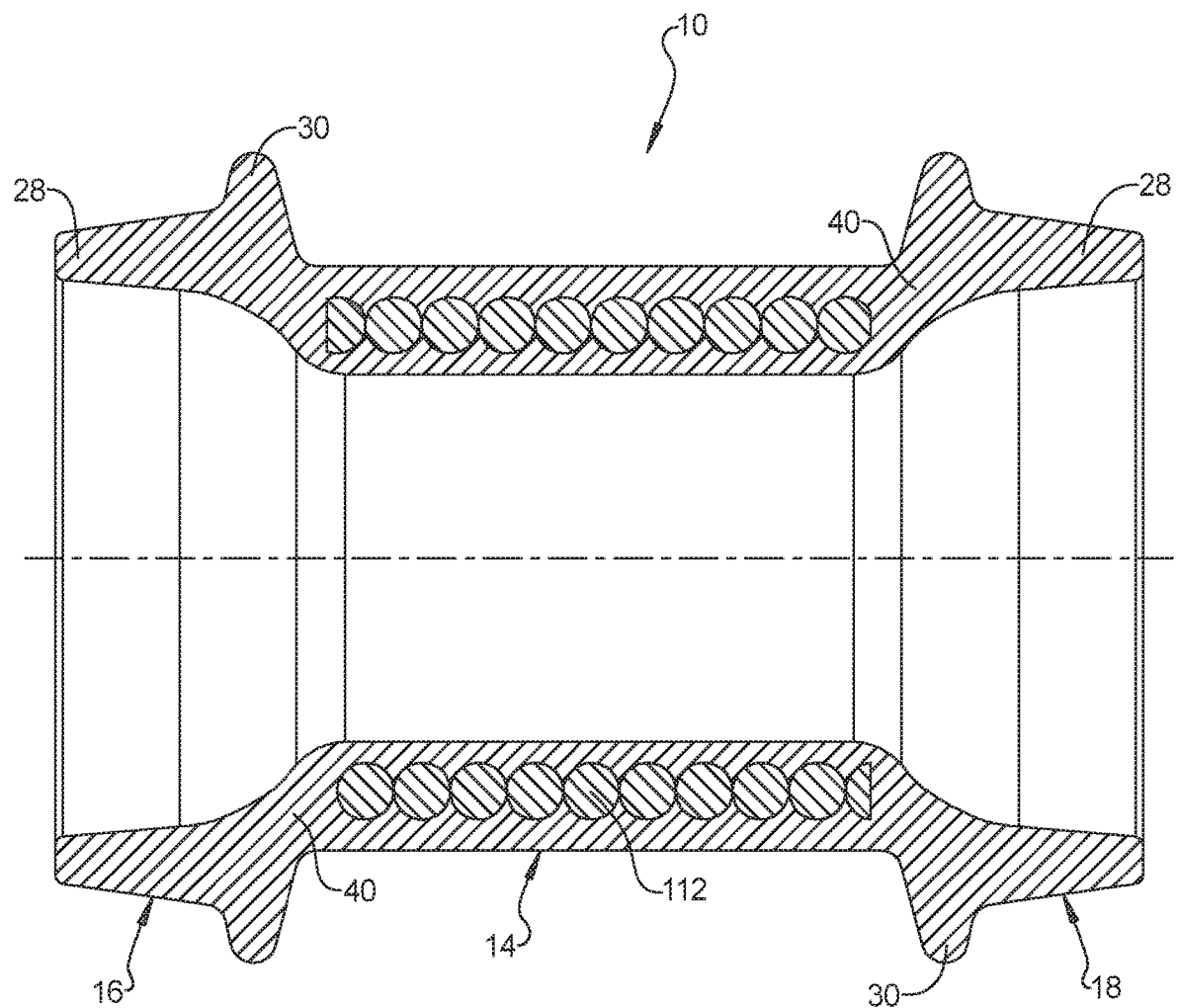
FIG. 4 is a cross-sectional view of a tube seal according to the principles of the present disclosure having a coil spring insert.

With reference to FIG. 1, a tube seal 10 according to the principles of the present disclosure will now be described. The tube seal 10 includes a cylindrical insert 12 and an elastomeric seal body 14 that can be over-molded to an outer surface and an inner surface of the cylindrical insert 12. The cylindrical insert 12 can be a rigid or semi-rigid tube made from metal, plastic, or other materials as shown in FIGS. 1 and 2 and alternatively can be formed as a coil spring 112 as shown in FIG. 4. The elastomeric seal body 14 includes a pair of seal lip regions 16, 18 extending axially beyond opposite ends of the cylindrical tube 12/112.

In FIG. 1, the tube seal 10 is shown in an un-deformed state disposed between two members 20, 22, with each of the seal lip regions 16, 18 being received in a bore 24, 26 of a respective one of the members 20, 22. The two members 20, 22 can be provided with a fluid passage 27 extending there through in communication with the bores 24, 26. The two members 20, 22 can take on many forms of tubes, blocks or machine components. The tube seal 10 is capable of accommodating misalignment between the fluid passages 27 of the two members 20, 22. The fluid passage 27 can have a smaller inside diameter $D_P$ than the inner diameter $D_B$ of the bores 24, 26. For purposes of this description one of the two seal lip regions 16 is being described with reference to FIGS. 2 and 3A-3C, since it is intended that both seal lip regions 16, 18 could have the same or similar geometries.

With reference to FIG. 2, in an unassembled condition, the seal lip region 16 extends beyond the end of the cylindrical insert 12 and includes an axially extending seal lip 28 that extends axially beyond the end of the cylindrical insert 12 and that has an outer diameter which can be larger than an outer diameter of the over-molded cylindrical insert 12. The seal lip region 16 further includes a radially outwardly extending seal lip 30 that extends radially outward from both the over-molded cylindrical insert 12 and the axially extending seal lip 28. FIG. 2 is intended to show the geometry of one embodiment of the seal lip region 16 to scale, although other geometries could be used. The axially extending seal lip 28 includes an outer diameter surface 32 that tapers radially inward from a proximal end to the distal end of the axially extending seal lip 28. In the embodiment shown, the outer diameter surface 32 tapers inward relative to an outer surface of the cylindrical insert 12 by an angle α1 of approximately 10°, while other angles can be used. In addition, the radially outwardly extending seal lip 30 can include tapered axially outboard and axially inboard surfaces $34_O$, $34_I$ that can be angled at an angle α2 of at least 90° and as shown in the present embodiment is approximately 105° relative to an outer surface of the cylindrical insert 12. The axially inboard surface $34_I$ of the radially outwardly extending seal lip 30 extends radially outward from an elastomeric hinge region 40. The elastomeric hinge region 40 is disposed axially between an end of the cylindrical insert 12 and the radially outward extending seal lip 30.

FIG. 1 is shown to scale with the relative interference between the bores 24, 26 of the two members 20, 22 and the seal lip regions 16, 18 of the tube seal 10. The opening end of the bores 24, 26 can be provided with an inwardly tapered surface 36 that radially narrows in a direction axially inward of the bore opening. The tapered surface 36 can have an open end diameter that is slightly larger than a diameter of the un-deformed radially outwardly extending seal lip 30. The tapered surface 36 has an inner end that has a diameter that is smaller than an outer diameter of the radially outwardly extending seal lip 30. The tapered surface 36 of the bores 24, 26 terminate at a generally cylindrical bore portion 38 in which the seal lip regions 16, 18 are inserted. The cylindrical bore portion 38 has an inner diameter $D_B$ that is larger than an outer diameter of the axially extending seal lip 28 in its un-deformed state but that is smaller than an outer diameter of the radially extending seal lip 30.

Figure 3A:
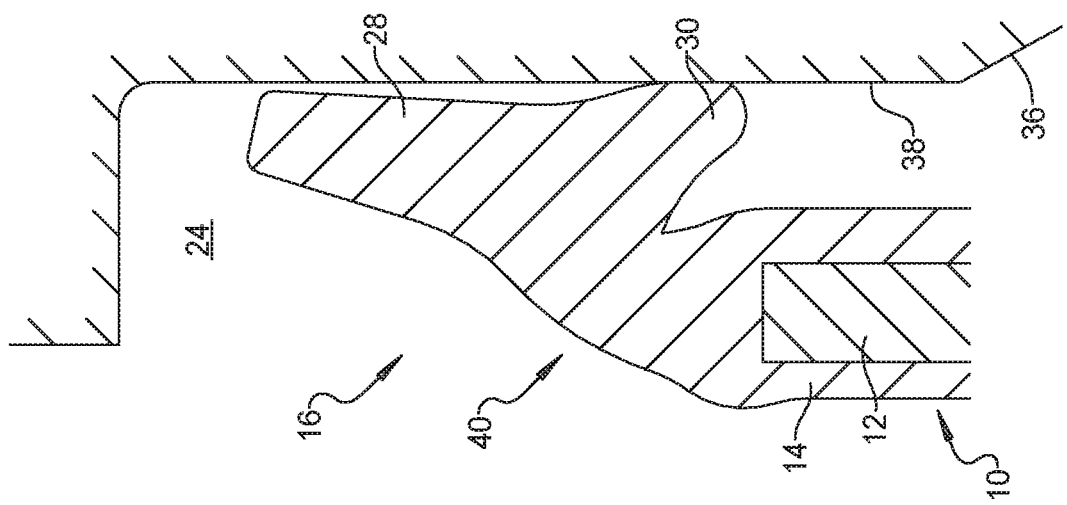
FIG. 3A is a detailed cross-sectional views of the seal lip region in an installed condition showing the deformation of the seal lip region under ambient pressure.
Figure 3B:
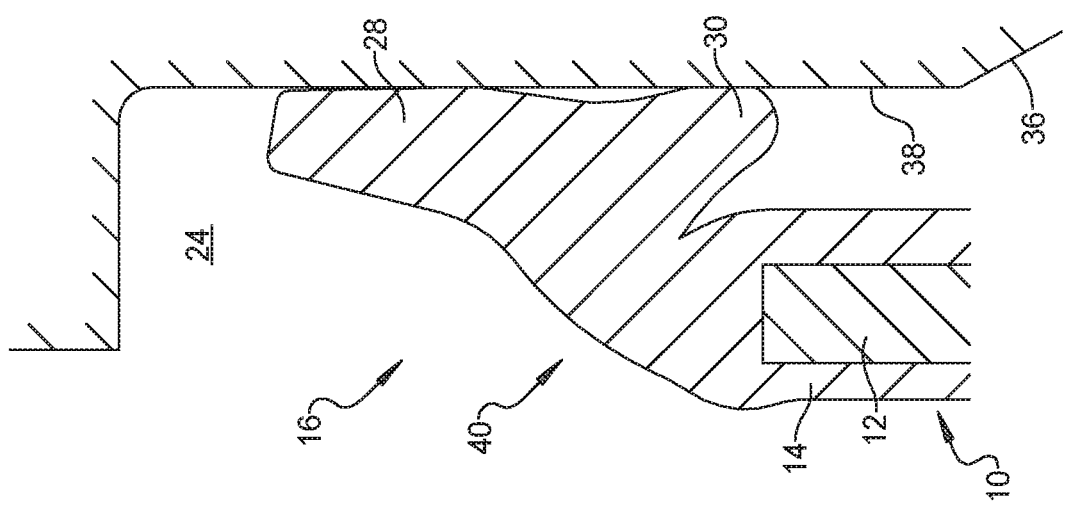
FIG. 3B is a detailed cross-sectional view of the seal lip region in an installed condition showing the deformation of the seal lip region under a positive 10 psi pressure.
Figure 3C:
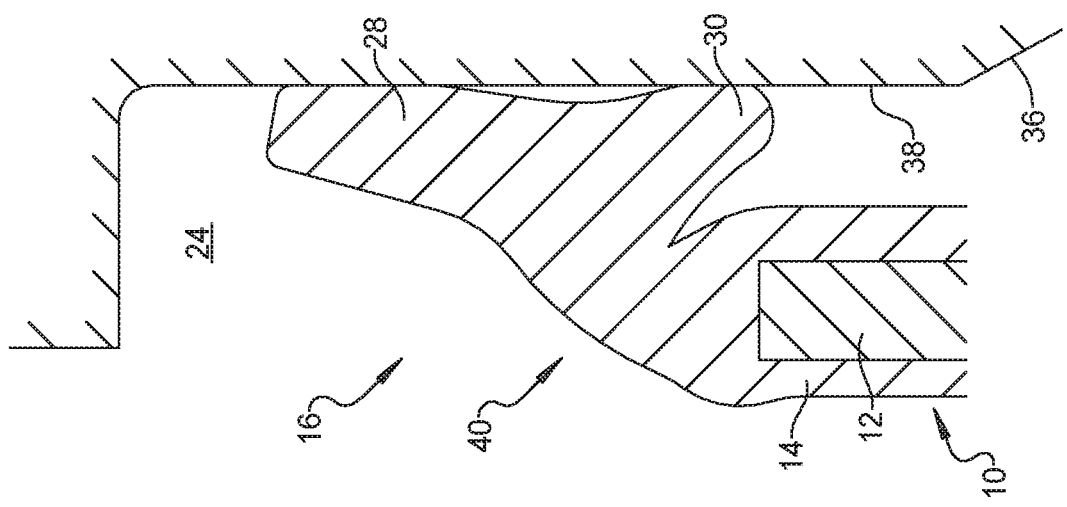
FIG. 3C is a detailed cross-sectional views of the seal lip region in an installed condition showing the deformation of the seal lip region under a negative 10 psi pressure.

FIGS. 3A-3C are detailed cross-sectional views of the seal lip region 16 in an installed condition showing the deformation of the seal lip region 16 under different operating pressures. In particular, FIG. 3A is a detailed cross-sectional view of the seal lip region in an installed condition showing the deformation of the seal lip region under ambient pressure. FIG. 3B is a detailed cross-sectional view of the seal lip region in an installed condition showing the deformation of the seal lip region under a positive 10 psi pressure. FIG. 3C is a detailed cross-sectional view of the seal lip region in an installed condition showing the deformation of the seal lip region under a negative 10 psi pressure.

The relative interference between the bores 24, 26 and the seal lip region 16 causes rotational deformation of the radially outwardly extending seal lip 30 which in turn causes the axially extending seal lip 28 to rotate about the elastomeric hinge region 40 in a radially outward direction to engage the inner cylindrical bore surface 38 of the bore 24, as shown in FIGS. 3A and 3B. In the illustrations of FIGS. 3A (ambient pressure) and 3B (positive pressure), the diamond cross-hatched region shows strain primarily at the deformed radially outwardly extending seal lip 30 and the hinge region 40. In the illustration of FIG. 3C, the tube seal 10 is exposed to negative vacuum pressure wherein the axially extending seal lip 28 can be lifted away from engagement with the cylindrical bore surface 38. In this illustration, increased diamond cross hatched regions in the deformed radially outwardly extending seal lip 30 and the hinge region 40 illustrate increased strain in those regions which result in increased sealing contact between the deformed radially outwardly extending seal lip 30 and the cylindrical bore surface 38.

The tube seal 10 according to the principles of the present disclosure provides improved reliability, reduced installation force, accommodates for various operating temperature and pressure conditions and accommodates for misalignment.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A sealing assembly, comprising:
a pair of opposing members each including a bore having an inner diameter; and
a tube seal including a cylindrical insert and an elastomeric seal body molded to an outer surface of the cylindrical insert, the elastomeric seal body including a pair of seal lip regions extending from opposite ends of the cylindrical insert and inserted into a respective bore of the pair of opposing members, the seal lip regions each including, in an unassembled condition, an axially extending seal lip and a radially outwardly extending seal lip connected to the ends of the cylindrical insert by an elastomeric hinge region, wherein the axially extending seal lip has a greater length than the radially outwardly extending seal lip and wherein upon insertion in the bore, the seal lip regions pivot about the hinge region to cause the axially extending seal lip to engage an inner cylindrical surface of the bore.

2. The sealing assembly according to claim 1, wherein in an unassembled condition, the axially extending seal lip has an outer diameter smaller than the inner diameter of the bore, and the radially extending seal lip has an outer diameter larger than the inner diameter of the bore.

3. The sealing assembly according to claim 2, wherein in an assembled condition, the radially outwardly extending seal lip of the pair of seal lip regions are deformed radially inward and axially toward the cylindrical insert, and the axially extending seal lip is pivoted radially outward toward the bore.

4. The sealing assembly according to claim 1, wherein the radially outwardly extending seal lip includes an axially outboard surface that is tapered.

5. The sealing assembly according to claim 1, wherein the axially extending seal lip includes an outer surface that tapers radially inwardly from a proximal end to a distal end.

6. The sealing assembly according to claim 1, wherein the radially outwardly extending seal lip includes an axially inboard facing surface that extends radially outward from the elastomeric hinge region.

7. The sealing assembly according to claim 6, wherein the axially inboard facing surface of the radially extending seal lip is disposed at an angle of at least 90 degrees relative to an outer surface of the elastomeric seal body on the outer surface of the cylindrical insert.

8. The sealing assembly according to claim 1, wherein the elastomeric hinge region is disposed axially between an end of the cylindrical insert and the radially outward extending seal lip.

9. The sealing assembly according to claim 1, wherein the elastomeric hinge region loads the axially and radially extending seal lips to compensate for misalignment of the respective bores.

10. The sealing assembly according to claim 1, wherein the cylindrical insert is a cylindrical tube.

11. A sealing assembly, comprising:
a pair of opposing members each including a bore having an inner diameter; and
a tube seal including a cylindrical insert and an elastomeric seal body molded to an outer surface of the cylindrical insert, the elastomeric seal body including a pair of seal lip regions extending from opposite ends of the cylindrical insert and inserted into a respective bore of the pair of opposing members, the seal lip regions each including, in an unassembled condition, an axially extending seal lip and a radially outwardly extending seal lip connected to the ends of the cylindrical insert by an elastomeric hinge region, wherein the axially extending seal lip has a larger outer diameter than an outer diameter of the elastomeric seal body on the outer surface of the cylindrical insert.

12. A sealing assembly, comprising:
a pair of opposing members each including a bore having an inner diameter; and
a tube seal including a cylindrical insert and an elastomeric seal body molded to an outer surface of the cylindrical insert, the elastomeric seal body including a pair of seal lip regions extending from opposite ends of the cylindrical insert and inserted into a respective bore of the pair of opposing members, the seal lip regions each including, in an unassembled condition, an axially extending seal lip and a radially outwardly extending seal lip connected to the ends of the cylindrical insert by an elastomeric hinge region, wherein the cylindrical insert is a coil spring.

13. A tube seal for insertion in respective bores in a pair of opposed members, the tube seal comprising:
a cylindrical insert; and
an elastomeric seal body molded to an outer surface of the cylindrical insert, the elastomeric seal body including a pair of seal lip regions extending from opposite ends of the cylindrical insert, the seal lip regions each including an axially extending seal lip and a radially outwardly extending seal lip connected to the ends of the cylindrical insert by an elastomeric hinge region, wherein the axially extending seal lip has a greater length than the radially outwardly extending seal lip and wherein upon insertion in the bore, the seal lip regions pivot about the hinge region to cause the axially extending seal lip to engage an inner cylindrical surface of the bore.

14. The tube seal according to claim 13, wherein the radially outwardly extending seal lip is disposed at a proximal end of the axially extending seal lip.

15. The tube seal according to claim 13, wherein the radially outwardly extending seal lip extends radially outward relative to the axially extending seal lip.

16. The sealing assembly according to claim 13, wherein the radially outwardly extending seal lip includes an axially outboard surface that is tapered.

17. The sealing assembly according to claim 13, wherein the axially extending seal lip includes an outer surface that tapers radially inwardly from a proximal end to a distal end.

18. The sealing assembly according to claim 13, wherein the radially outwardly extending seal lip includes an axially inboard facing surface that extends radially outward from the elastomeric hinge region.

19. The sealing assembly according to claim 18, wherein the axially inboard facing surface of the radially extending seal lip is disposed at an angle of at least 90 degrees relative to an outer surface of the elastomeric seal body on the outer surface of the cylindrical insert.

20. The sealing assembly according to claim 13, wherein the elastomeric hinge region is disposed axially between an end of the cylindrical insert and the radially outward extending seal lip.

21. The sealing assembly according to claim 13, wherein the elastomeric hinge region loads the axially and radially extending seal lips to compensate for misalignment of respective bores.

22. The sealing assembly according to claim 13, wherein the cylindrical insert is a cylindrical tube.

23. A tube seal for insertion in respective bores in a pair of opposed members, the tube seal comprising:
 a cylindrical insert; and
 an elastomeric seal body molded to an outer surface of the cylindrical insert, the elastomeric seal body including a pair of seal lip regions extending from opposite ends of the cylindrical insert, the seal lip regions each including an axially extending seal lip and a radially outwardly extending seal lip connected to the ends of the cylindrical insert by an elastomeric hinge region, wherein the axially extending seal lip has a larger outer diameter than an outer diameter of the elastomeric seal body on the outer surface of the cylindrical insert.

24. A tube seal for insertion in respective bores in a pair of opposed members, the tube seal comprising:
 a cylindrical insert; and
 an elastomeric seal body molded to an outer surface of the cylindrical insert, the elastomeric seal body including a pair of seal lip regions extending from opposite ends of the cylindrical insert, the seal lip regions each including an axially extending seal lip and a radially outwardly extending seal lip connected to the ends of the cylindrical insert by an elastomeric hinge region, wherein the cylindrical insert is a coil spring.

* * * * *